United States Patent [19]

Lotz

[11] Patent Number: 5,964,608
[45] Date of Patent: Oct. 12, 1999

[54] READER FOR CHIP CARDS

[75] Inventor: Reinhard Lotz, Erzhausen, Germany

[73] Assignee: Thomas & Betts International, Inc., Sparks, Nev.

[21] Appl. No.: 09/101,168
[22] PCT Filed: Nov. 4, 1997
[86] PCT No.: PCT/EP97/06094
  § 371 Date: Nov. 16, 1998
  § 102(e) Date: Nov. 16, 1998
[87] PCT Pub. No.: WO98/20443
  PCT Pub. Date: May 14, 1998

[30] Foreign Application Priority Data

Nov. 4, 1996 [DE] Germany ......... 296 18 976 U

[51] Int. Cl.⁶ ............................................. H01R 13/703
[52] U.S. Cl. ........................................ 439/188; 235/479
[58] Field of Search .................. 439/188; 200/51.09, 200/51.1; 235/441, 475, 479

[56] References Cited

U.S. PATENT DOCUMENTS

| | | | |
|---|---|---|---|
| 4,904,852 | 2/1990 | Mita et al. | 235/441 |
| 5,334,827 | 8/1994 | Bleier et al. | 235/441 |
| 5,370,544 | 12/1994 | Reichardt | 439/188 |

FOREIGN PATENT DOCUMENTS

| | | |
|---|---|---|
| 316699 | 5/1989 | European Pat. Off. . |
| 715272 | 6/1996 | European Pat. Off. . |
| 19502176 | 8/1996 | Germany . |

*Primary Examiner*—Neil Abrams
*Attorney, Agent, or Firm*—Hoffman & Baron, LLP

[57] ABSTRACT

Read apparatus for chip cards with a housing (1) in which a contact support (3), with a number of contact pairs (4,4a) that corresponds to the number of read tracks and that can be connected by a limit switch (12), is held and a slide (6), operated by the chip card and acting on the contacts (4,4a) or the contact support (3), is guided such that, upon moving the card close to its end position, the contacts (4,4a) are pressed, on the one hand, firmly onto the contact field of the chip by means of the slide (6) and, on the other hand, the limit switch (12) is closed, wherein the limit switch (12) is arranged on the side next to the contact support (3) in the area between the card insertion slot and the slide (6), and wherein the slide (6) is equipped with a bar (13) having a tab (14) which reaches behind the contacts (12a, 12b) of the limit switch on the side of the card insertion slot with a spacing such that the limit switch (12) is closed by the entrainment of the slide (6) brought about by the approach of the card to its end position.

2 Claims, 2 Drawing Sheets

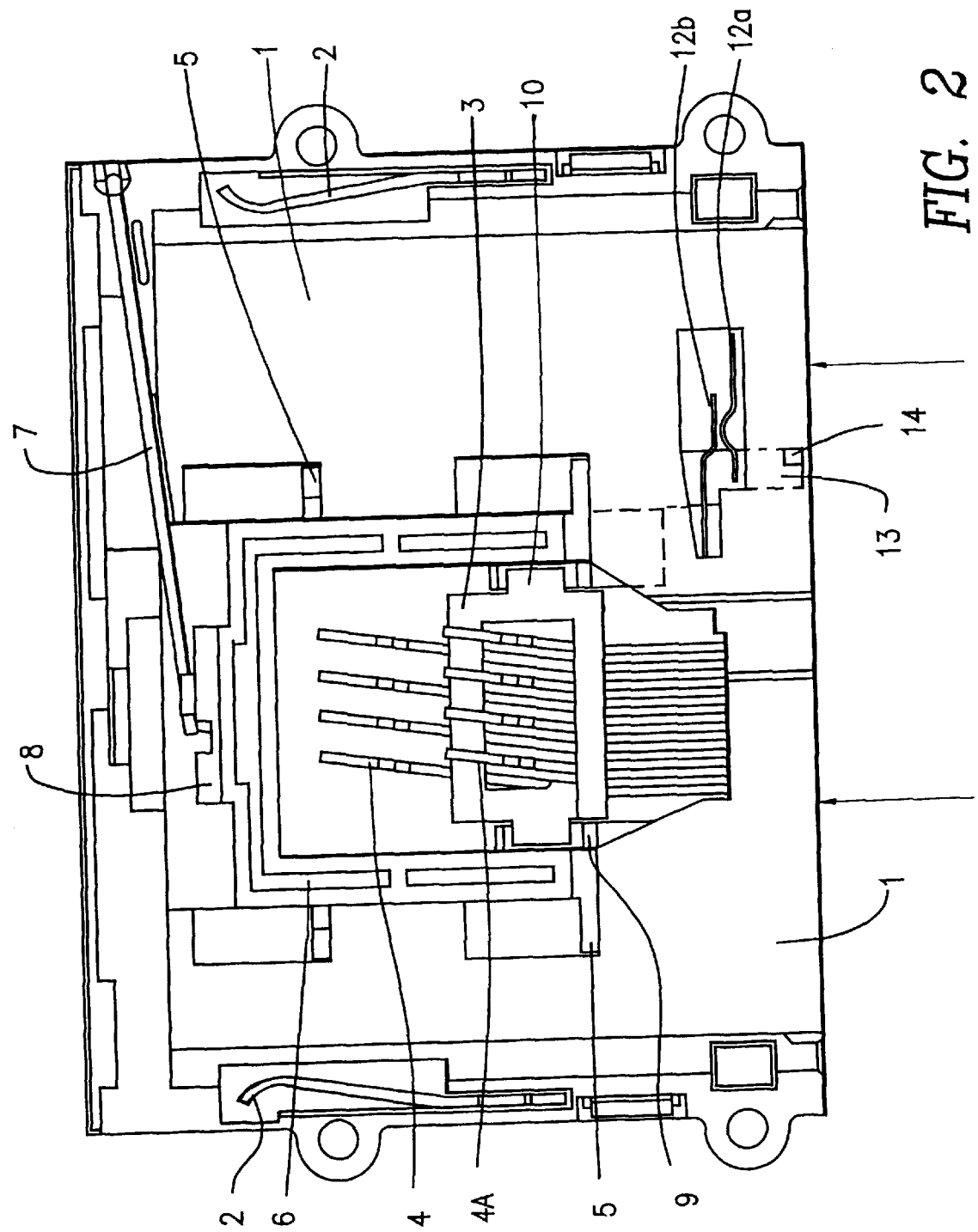

READER FOR CHIP CARDS

BACKGROUND OF THE INVENTION

The invention proceeds from a read apparatus for chip cards according to the preamble of claim 1. In known read apparatuses of this type, the limit switch closing the circuit between the contacts and the read tracks is in the vicinity of the contact support, as a rule, directly on top of the contact support, such that, upon insertion into the card slot, the chip card entrains one of the contacts and presses it against the opposing contact immediately before reaching its final position. Functionally, the arrangement has largely proven itself, but nonetheless the position of the limit switch in the end area of the chip card is considered disadvantageous in that, in case of frequent actuation, that is, frequent insertion end pulling out of the card, the appearance of worn-off material from the card is inevitable, accumulating in particular on the opposing contact and leading to an insulation effect all the way to complete interruption of functioning.

The present invention is based on the problem of creating a read apparatus for chip cards in which the contamination of the contact by worn-off material or by the card in some other manner is largely avoided.

SUMMARY OF THE INVENTION

This problem is solved by a read apparatus with the characteristics reproduced in claim.

A read apparatus for chip cards is created by the invention in which the limit switch lies inside a closed chamber which is largely hermetically enclosed and thus is practically completely protected against the ingress of dust. Differing from the known limit switch arrangements, moreover, a pivoting of the two contact blades takes place during the entrainment after landing of the entrained contact on the opposing contact, due to the play that must be maintained, and thus, because of their differing pivot radii, a displacement of the contact point takes place with a frictional effect, whereby a continual self-cleaning of the contact field is brought about.

BRIEF DESCRIPTION OF THE DRAWING FIGURES

Further details of the invention characterized in the claims are explained below on the basis of the attached drawings. These show, in FIG. 1, a view from above onto the housing of the read apparatus;

FIG. 2, a view from below onto the read apparatus reproduced in FIG. 1.

DETAILED DESCRIPTION OF THE PREFERRED EMBODIMENTS

Figure 1:
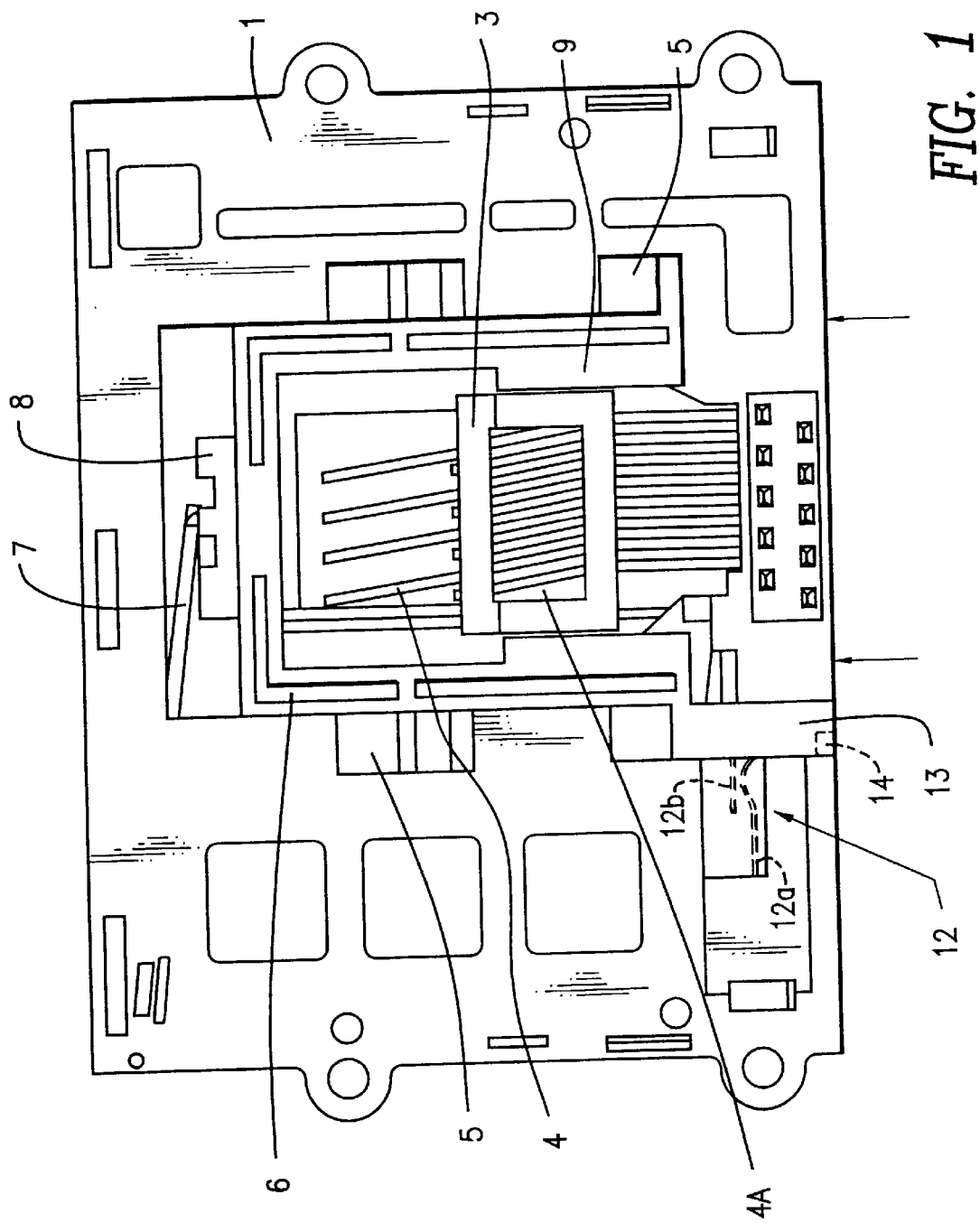

The read apparatus for chip card consists of a housing 1 that is closed off by means of a lid, not shown, and into which the chip card is pushed for operation under lateral guidance by means of the leaf springs 2 in the direction designated by the arrow. Inside the housing, a contact support 3, with a number of contact pairs 4,4a corresponding to the number of contacting fields, is held. Also provided is a slide 6 running on guides 5, which in the case of this example is pressed upon by a spring 7 in the direction towards the insertion slot and has a stop 8, against which the chip card makes contact with its front end when approaching its final (read) position. Inclined ramps 9 are also arranged on the slide and interact with pins 10 arranged on the contact support 3 such that, upon approach of the card to its final position, the slide 6 is entrained and in the process the inclined ramps 9 sliding up onto the pins 10 of the contact support 3 bring about a pivoting of the contact support 3 and thus the contact pairs 4, 4a, such that they are pressed firmly onto the chip arranged on the card.

The limit switch 12 is arranged on the side next to the contact support 3 in the area between the card insertion slot and the slide 6, the slide 6 being equipped by means of a bar 13 (FIG. 1) with a tab 14 (FIG. 2) which, upon displacement of the slide 6 under the force of the inserted card first strikes the contact 12a and then entrains it on its additional travel to contact 12b, whereby the electrically conductive connection is produced. It can be recognized from the drawing that the switch lies in a chamber which is formed by the housing 1 and the housing lid, not shown, and is largely hermetically enclosed and thus practically completely protected against the ingress of dust. It is also clearly recognizable that the two contracts 12a, 12b, because of the differing positions of their pivot circles after the placement of the contact 12a on the contact 12b, slide against one another a with a frictional displacement of the contact point, whereby a continual self-cleaning of the contact field of the switch is brought about.

What is claimed is:

1. Read apparatus for chip cards with a housing (1) in which a contact support (3), with a number of contact pairs (4,4a) that corresponds to the number of read tracks and that can be connected by a limit switch (12), is held and a slide (6) operated by the chip card and acting on the contacts (4, 4a) or the contact support (3) is guided such that upon moving the card close to its end position, the contacts (4,4a) are pressed, on the one hand, firmly onto the contact field of the chip by means of the slide (6) and, on the other hand, the limit switch (12) is arranged on the side next to the contact support (3) in the area between the card insertion slot and the slide (6), and in that the slide (6) is equipped with a tab (13,14) which reaches behind the contacts (12a, 12b) of the limit switch on the side of the card insertion slot with a spacing such that the limit switch (12) is closed by the entrainment of the slide (6) brought about by the approach of the card to its end position.

2. Read apparatus for chip cards according to claim 1, characterized in that the limit switch (12) is formed by two small leaf springs (12a, 12b) held so as to pivot.

* * * * *